(12) United States Patent
Kazmierzak

(10) Patent No.: US 8,893,657 B1
(45) Date of Patent: Nov. 25, 2014

(54) WALL-MOUNTED RECESSED PET FEEDING SYSTEM

(71) Applicant: Roy J. Kazmierzak, Indianapolis, IN (US)

(72) Inventor: Roy J. Kazmierzak, Indianapolis, IN (US)

( * ) Notice: Subject to any disclaimer, the term of this patent is extended or adjusted under 35 U.S.C. 154(b) by 89 days.

(21) Appl. No.: 13/655,906

(22) Filed: Oct. 19, 2012

(51) Int. Cl.
 *A01K 5/01* (2006.01)

(52) U.S. Cl.
 USPC .................................... 119/61.57; 119/51.5

(58) Field of Classification Search
 USPC .............. 119/51.5, 61.5, 61.57; 312/242, 108
 IPC ................................................ A01K 5/01,7/00
 See application file for complete search history.

(56) References Cited

U.S. PATENT DOCUMENTS

| | | | | |
|---|---|---|---|---|
| 1,900,868 A | * | 3/1933 | Ritchie | 119/515 |
| 2,555,396 A | | 6/1951 | Cosner | |
| 2,659,345 A | * | 11/1953 | Herbert | 119/28.5 |
| 2,800,380 A | * | 7/1957 | Baker | 312/245 |
| 2,997,022 A | * | 8/1961 | Kay | 119/61.31 |
| 3,606,506 A | * | 9/1971 | Ungaro | 312/111 |
| 3,743,372 A | * | 7/1973 | Ruggerone | 312/108 |
| 4,231,626 A | * | 11/1980 | Amtmann et al. | 312/350 |
| 4,634,193 A | * | 1/1987 | Liu | 312/107 |
| 5,144,912 A | | 9/1992 | Hammett et al. | |
| 5,152,247 A | * | 10/1992 | Brown | 119/464 |
| 5,222,990 A | * | 6/1993 | Elliott | 119/51.5 |
| 5,435,266 A | * | 7/1995 | Carson | 119/464 |
| 7,458,338 B2 | * | 12/2008 | Keller | 119/475 |
| 8,342,129 B2 | * | 1/2013 | Harper | 119/61.5 |
| 2003/0116094 A1 | | 6/2003 | Diln | |
| 2004/0144330 A1 | * | 7/2004 | Marchioro | 119/477 |
| 2009/0015121 A1 | * | 1/2009 | Sampson | 312/242 |
| 2013/0145990 A1 | * | 6/2013 | Macpherson | 119/61.5 |

* cited by examiner

*Primary Examiner* — Shadi Baniani
(74) *Attorney, Agent, or Firm* — Robert C. Montgomery; Montgomery Patent & Design

(57) ABSTRACT

A wall-mounted, recessed pet feeding system includes a base that can be installed in a wall stud cavity at a predetermined height above a floor. The pet feeding system further includes a pair of pet bowls which interlock into the base to prevent spilling while also enabling easy removal for cleaning and filling.

10 Claims, 2 Drawing Sheets

WALL-MOUNTED RECESSED PET FEEDING SYSTEM

RELATED APPLICATIONS

There are currently no applications co-pending with the present application.

FIELD OF THE INVENTION

The presently disclosed subject matter relates to feeding pets. More particularly, it relates to a system in which pet feeding bowls are recessed into walls.

BACKGROUND OF THE INVENTION

Millions of Americans keep pets. But caring for a pet is a time-consuming, demanding task that requires a pet owner to continually feed, groom, and clean up after their animal friends. Common pets such as cats and dogs usually receive their food and water from bowls that are resting on the floor. While this works well in many situations, bowls are prone to being tripped over and their contents spilled by adults or children walking by. In addition, such pet bowls must be frequently moved when vacuuming or sweeping and they can take up a relatively large amount of floor space, which may be in short supply in smaller homes. Finally, placing pet bowls on the floor forces pets to bend their head all the way down to eat or drink, which may be uncomfortable or even unhealthy, especially for large pets.

Accordingly, there exists a need for better pet feeding system that eliminates tripping and spilling of pet bowls while also saving floor space. Beneficially such as system would enable a pet to eat and drink from an elevated position that suits the pet's size and shape. Even more beneficially such a system would be easily installed using a minimum of common hand tools.

SUMMARY OF THE INVENTION

The principles of the present invention provide for a pet feeding system that is inserted and installed in a wall stud cavity at a predetermined height above the floor. The height is determined by the size and shape of the pet it will be used to feed and water. A small version can easily fit between two (2) studs in a single stud cavity while a larger version might span over two (2) stud cavities. The pet feeding system includes removable pet bowls which snap in and out of a base. Removable bowls enable easy cleaning and filling while the snap feature provides positive retention of the bowls. These pet feeding system provides the benefit of keeping the feed bowls off of floors, thus avoiding tripping and spilling and saving floor space, while also elevating the pet bowls for easier eating and drinking by the pet.

A pet feeding system that is in accord with the principles of the present invention includes a base that is configured to mount between the studs of a wall. The base has an opened-front body comprised of a rear body panel, a pair of opposing "L"-shaped side body panels that extend from the rear body panel, a pair of "L"-shaped flanges attached to the "L"-shaped side body panels, and a bottom panel and a top panel that are connected to the rear body panel, to "L"-shaped side body panels, and to the "L"-shaped flanges. The pet feeding system further includes at least one (1) removable pet bowl lockable into position on the bottom panel. Beneficially the "L"-shaped flanges include apertures that enable fasteners to attach the pet feeding system to wall studs. A "T"-shaped divider separates the bottom panel into two (2) sections, each for retaining a pet bowl. Each pet bowl is also "T"-shaped, has an open top, and is dimensioned to fit between the "T"-shaped divider, an "L"-shaped flange, and an "L"-shaped side body panel. Each pet bowl should fit rather snuggly into the base.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
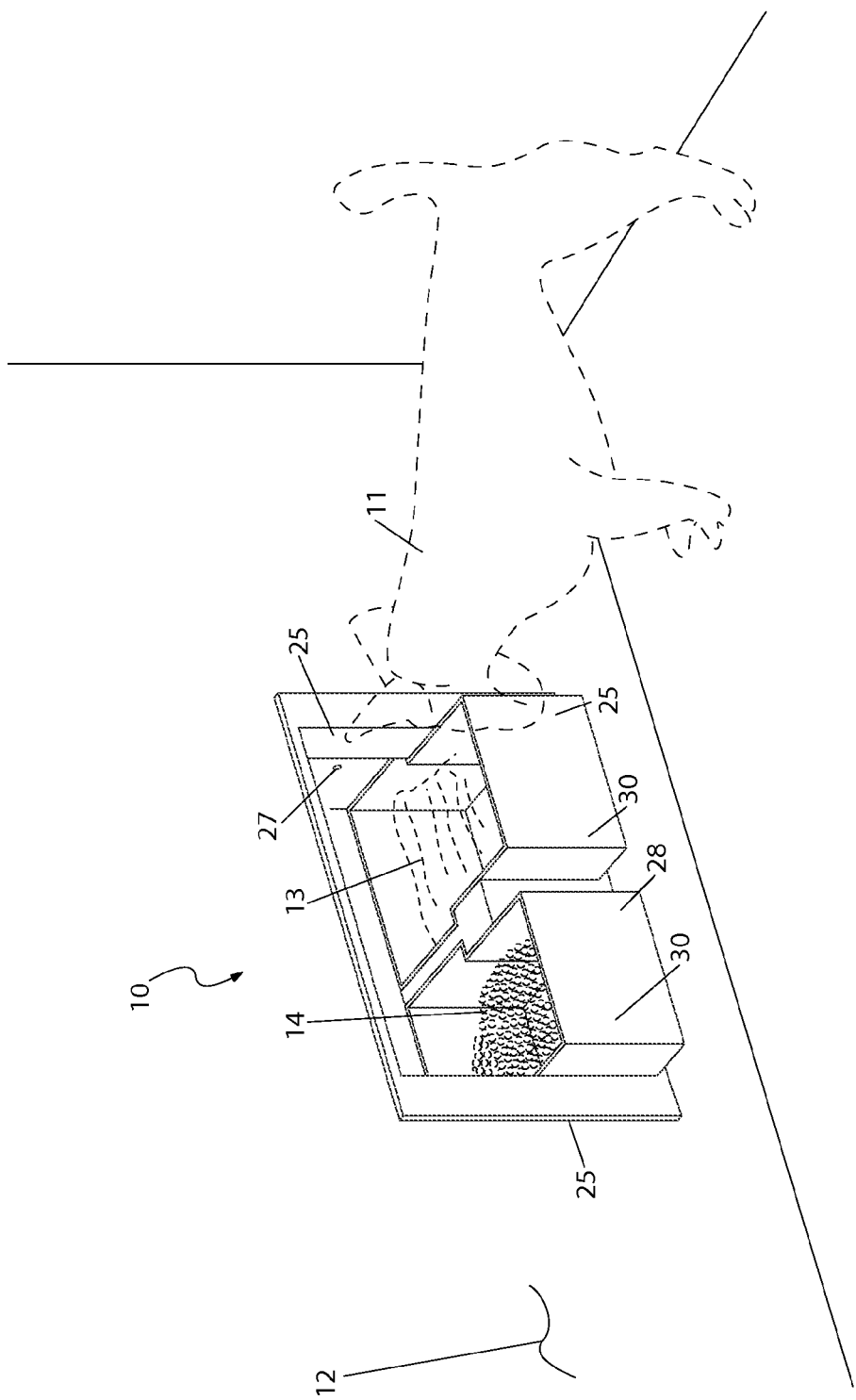
FIG. 1 is an environmental view of a wall-mounted recessed pet feeding system 10 that is in accord with a preferred embodiment of the present invention.

DESCRIPTIVE KEY 10 pet feeding system
11 pet
12 wall
13 fluid
14 foodstuff
20 base
21 side panel
22 bottom panel
23 rear panel
24 top panel
25 flange
26 aperture
27 fastener
28 divider
30 bowl
31 bowl front panel
32 bowl rear panel
33 bowl side panel
34 bowl corner panel
35 bowl bottom panel
36 interior portion
40 gap

DETAILED DESCRIPTION OF THE PREFERRED EMBODIMENT

Figure 2:
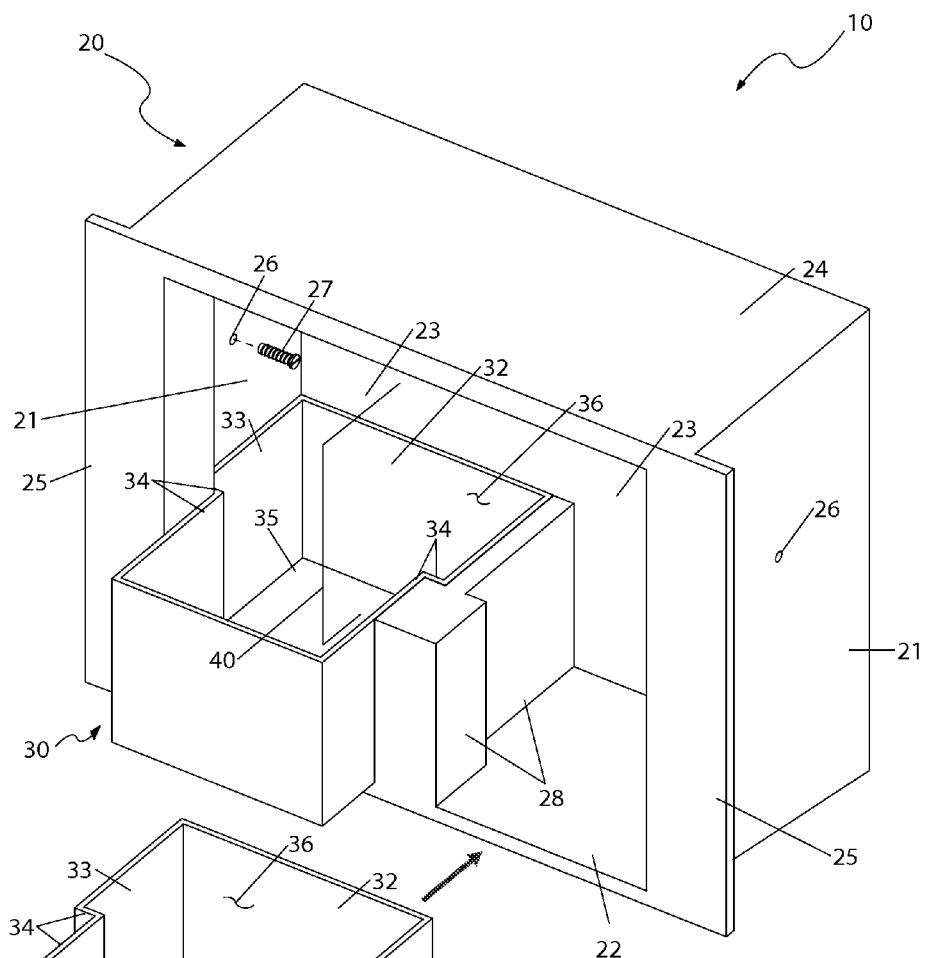
FIG. 2 is a perspective view of the pet feeding system 10 shown in FIG. 1.
Figure 3:
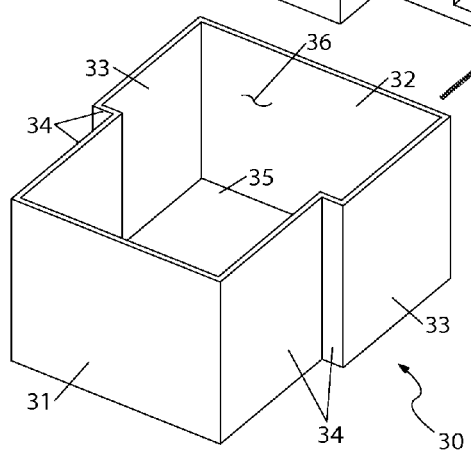
FIG. 3 is a perspective view of a bowl 30 used in the pet feeding system 10 shown in FIG. 1 and FIG. 2.

The best mode for carrying out the invention is presented in terms of its preferred embodiment, herein depicted within FIGS. 1 through 3, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention provides for a recessed pet feeding system 10 which mounts in a wall 12 and which elevates pet bowls 30 containing fluid (usually water) 13 and foodstuffs 14 for pets 11 off of the floor while saving floor space and avoiding tripping.

Refer now to FIG. 1 where an environmental view of the pet feeding system 10 is disclosed. The pet feeding system 10 comprises a base 20 (see FIG. 2) and a pair of pet bowls 30. The base 20 is mounted into the wall 12 at a height which is suitable for the pet 11. The bowls 30 are removably inserted into the base 20 and are used to retain fluid 13 such as water and foodstuffs 14 such as pet food. The pet feeding system 10 reduces or eliminates spilling of the fluids 13 and foodstuffs 14.

FIG. 2 presents a perspective view of the pet feeding system 10. The base 20 is comprised of a generally rectangular open-front body which is preferably fabricated from a durable plastic. The base 20 includes a rear panel 23, a pair of opposing "L"-shaped side panels 21 that extend inward from the rear panel 23, a pair of "L"-shaped flanges 25 that extend from the "L"-shaped side panels 21, and a bottom panel 22 and a top panel 24 that connect to the rear panel 23, the side panels 21, and the flanges 25. When the pet feeding system 10 is installed the side panels 21, flanges 25, rear panel 23, and top panel 24 hide the interior of the wall 12 while also creating an overall aesthetically pleasing design. The bottom panel 22 retains each bowl 30.

To install the pet feeding system 10, a section of wall 12 that corresponds with the dimensions of the pet feeding system 10 is removed from the desired location. Preferably, the removed wall section is between existing studs. The base panels 21, 22, 23, 24, and part of the flanges 25 are then inserted into the wall 12 such that the remainders of the flanges 25 mount flush against the wall 12. The flanges 25 enable the base 20 to be mounted to the wall 12 via fasteners 27 which pass through apertures 26 in the opposing side panels 21.

Referring now to both FIG. 1 and FIG. 2, extending upward from an intermediate portion of the bottom panel 22 and inward from the rear panel 23 is a "T"-shaped divider 28. The "T"-shaped divider 28 separates the bowls 30 when they are in the base 20 while also acting to retain the bowls 30 as described in more detail below.

Referring now to FIG. 3, the bowls 30 are each somewhat "T"-shaped and open top container which retain fluid 13 or foodstuffs 14 within an interior 36. Each bowl 30 includes a bowl front panel 31, a bowl rear panel 32, a pair of opposing bowl side panels 33, a pair of opposing "L"-shaped bowl corner panels 34, and a bowl bottom panel 35. The bowls 30 are preferably fabricated from materials similar to the base 20. The bowl front panels 31 are slightly smaller than the distance between the inner edge of the divider 28 and an inner edge of a flange 25. The bowl side panels 33 have a width similar to the width of the base side panels 21 and extends forward of the divider 28 to allow the pet 11 to insert their head or mouth into the bowls 30. One (1) bowl corner panel 34 "L"-shape mates against the angle formed between a flange 25 and the side panel 21 while the other "L"-shape mates against an angle formed by the divider 28 "T". This mating of surfaces creates interlocks that prevent the bowls 30 from unintentionally being removed from the base 20. However, the divider 28 has a limited height which enables the bowls 30 to be raised above the divider 28 and removed. The height of the bowls 30 is preferably the same as the height of the divider 28 to create sufficient clearance for a pet 11 to insert their head or mouth for retrieval of fluid 13 or foodstuffs 14 from the bowls 30.

It is envisioned that other styles and configurations of the present invention can be easily incorporated into the teachings of the present invention, and while only one particular configuration is shown and described, that is for purposes of clarity and disclosure and not for limitation of scope.

The preferred embodiment of the present invention can be utilized by the common user in a simple and effortless manner with little or no training. After initial purchase or acquisition of the pet feeding system 10 it would be installed as indicated in FIG. 1. The method of installing and using the pet feeding system 10 may be achieved by performing the following steps: acquiring the pet feeding system 10; removing a part of the wall 12 which corresponds to the dimensions of the base 20; fastening the base 20 to the wall 12 by inserting fasteners 27 into the apertures 26 in the side panels 21; filling each bowl 30 with fluid 13 or foodstuffs 14; inserting each bowl 30 into the base 20; and enabling the pet 11 to utilize the per feeding system 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A pet feeding system, comprising:
   a base configured to mount between studs of a wall, said base having an opened-front body comprised of a rear body panel, a pair of opposing "L"-shaped side body panels that extend from said rear body panel, a pair of "L"-shaped flanges attached to said "L"-shaped side body panels, and a bottom panel and a top panel that are connected to said rear body panel, to "L"-shaped side body panels, and to said "L"-shaped flanges;
   at least one removable pet bowl lockable into position on said bottom panel; wherein said
   "L"-shaped side body panels include apertures, and wherein said base is attachable to a wall by passing fasteners passing through said apertures; and,
   wherein said base further includes a "T"-shaped divider that separates said bottom panel into two sections.

2. The pet feeding system according to claim 1, wherein said flange apertures are spaced to align with wall studs.

3. The pet feeding system according to claim 1, wherein said at least one removable pet bowl is "T"-shaped and dimensioned to fit between said "T"-shaped divider, a first "L"-shaped flange of said pair of "L"-shaped flanges, and a first "L"-shaped side body panel of said pair of "L"-shaped body panels.

4. The pet feeding system according to claim 3, wherein said at least one removable pet bowl includes a bowl front panel, a bowl rear panel, a pair of opposing bowl side panels extending from said bowl rear panel, a pair of opposing "L"-shaped bowl corner panels attached between said bowl front panel and said bowl side panels, and a bowl bottom panel.

5. The pet feeding system according to claim 4, wherein said bowl front panel fits between said "T"-shaped divider and an "L"-shaped flange.

6. The pet feeding system according to claim 5, wherein said bowl side panels have a depth greater than the depth of a side body panel.

7. The pet feeding system according to claim 6, wherein an "L"-shaped bowl corner panel mates against an "L"-shaped flange and an "L"-shaped side body panel.

8. The pet feeding system according to claim 1, wherein said at least one removable pet bowl has an open top.

9. The pet feeding system according to claim 1, wherein said "T"-shaped divider enables the pet bowl to be removed from said body.

10. The pet feeding system according to claim 1, wherein said body is comprised of molded plastic.

\* \* \* \* \*